(12) United States Patent
Carter et al.

(10) Patent No.: US 10,137,525 B2
(45) Date of Patent: Nov. 27, 2018

(54) FRICTION WELDING SYSTEM

(71) Applicant: The Boeing Company, Chicago, IL (US)

(72) Inventors: Matthew Douglas Carter, Portland, OR (US); Keith Allen Richmond, Oregon City, OR (US); Eric Carl Eide, Gresham, OR (US)

(73) Assignee: The Boeing Company, Chicago, IL (US)

( * ) Notice: Subject to any disclaimer, the term of this patent is extended or adjusted under 35 U.S.C. 154(b) by 430 days.

(21) Appl. No.: 14/858,284

(22) Filed: Sep. 18, 2015

(65) Prior Publication Data

US 2017/0080517 A1    Mar. 23, 2017

(51) Int. Cl.
*B23K 20/12* (2006.01)
(52) U.S. Cl.
CPC ............ *B23K 20/12* (2013.01); *B23K 20/128* (2013.01); *B23K 20/129* (2013.01)
(58) Field of Classification Search
CPC .................................................. B23K 20/1205
USPC ......................................... 228/112, 114.5, 2.1
See application file for complete search history.

(56) References Cited

U.S. PATENT DOCUMENTS

| | | | | |
|---|---|---|---|---|
| 3,144,710 A | * | 8/1964 | Camps-Campins | ........................ B23K 20/129 228/114.5 |
| 3,618,196 A | * | 11/1971 | Sluetz | .................. B23K 20/129 156/73.5 |
| 6,237,834 B1 | * | 5/2001 | Mahoney | ............. B23K 20/129 228/112.1 |
| 6,779,708 B2 | | 8/2004 | Slattery | |
| 7,624,907 B2 | | 12/2009 | Alessi et al. | |
| 2001/0004989 A1 | | 6/2001 | Ezumi et al. | |

FOREIGN PATENT DOCUMENTS

| | | |
|---|---|---|
| EP | 3053698 A1 | 8/2016 |
| JP | 2002161741 A | 6/2002 |
| JP | 2010179349 A | 8/2010 |
| WO | WO2012029175 A1 | 3/2012 |
| WO | WO2013085955 A1 | 6/2013 |

OTHER PUBLICATIONS

Extended European Search Report, dated Jan. 26, 2017, regarding Application No. EP16174000.6, 6 pages.

* cited by examiner

*Primary Examiner* — Erin B Saad
(74) *Attorney, Agent, or Firm* — Yee & Associates, P.C.

(57) ABSTRACT

A method and friction welding system for friction welding. Metallic components are positioned such that welding surfaces of the metallic components contact each other. A metallic component in the metallic components has a relief feature adjacent to a welding surface for the metallic component. The welding surfaces are moved relative to each other while the welding surfaces are in contact such that solid-state joining of the metallic components at the welding surfaces occurs to form a structure. The relief feature causes a material from at least one of the metallic components to form with respect to the relief feature in a manner that enables performing an additional solid-state joining operation with the structure at a subsequent welding surface on the structure without removing flash.

14 Claims, 12 Drawing Sheets

FRICTION WELDING SYSTEM

BACKGROUND INFORMATION

1. Field

The present disclosure relates generally to manufacturing structures and, in particular, to joining components to form a structure. Still more particularly, the present disclosure relates to a method and apparatus for joining components to form a structure using friction welding.

2. Background

Structures may be manufactured in a number of different ways. For example, machining is a process in which a material is removed from a piece of raw material to form a structure. A piece of raw material, such as metal, may be cut into a final shape using a controlled removal process in a computer numerical control (CNC) machine. These types of machines for removing material include mills, lathes, and other types of cutting machines.

However, more starting material than desired is often needed when machining is used to form a structure from a block of metal. The material removed compared to the material remaining for the structure may be greater than desired from a cost perspective. For example, a flap support structure may be formed by machining a forged block that is about 170 pounds.

In contrast, forming the flap support structure using friction welding may involve components with a weight of 61 pounds. Friction welding is a solid-state welding process that generates heat through mechanical friction.

For example, friction may occur when components are moved relative to each other. Additionally, a lateral force may be used to displace and fuse the components to each other.

During this welding process, moving one or more of the components relative to each other results in a softening of a region of material in the components. The softening of the material results in the material being extruded away from the interface where the welding occurs. This material is flash that forms from the friction welding process. The flash is often not desirable and is removed using machining.

Depending on the number of components being joined together to form the structure, machining may need to be performed between joining operations. For example, the flash formed from joining components may interfere with joining other components. The flash may cover an area where additional joining is desired. Machining may be performed to remove the flash such that other components may be joined.

This process of welding in machining, however, may take more time and effort than desired even though less material is used. For example, setup time occurs in positioning the structure in the machining tool. Additional setup time occurs in placing the structure in new components in a friction welding system.

Therefore, it would be desirable to have a method and apparatus that into account at least some of the issues. Discussed above, as well as other possible issues. For example, it would be desirable to have a method and apparatus that overcome a technical problem with reducing the time needed to join components using friction welding to form a structure. More specifically, it would be desirable to have a method and apparatus that overcome the technical problem with flash being formed during joining of components on locations where subsequent joining is to occur in forming a structure.

SUMMARY

An embodiment of the present disclosure provides a method for friction welding. Metallic components are positioned such that welding surfaces of the metallic components contact each other. A metallic component in the metallic components has a relief feature adjacent to a welding surface for the metallic component. The welding surfaces are moved relative to each other while the welding surfaces are in contact such that solid-state joining of the metallic components at the welding surfaces occurs to form a structure. The relief feature causes a material from at least one of the metallic components to form with respect to the relief feature in a manner that enables performing an additional solid-state joining operation with the structure at a subsequent welding surface on the structure without removing flash.

Another embodiment of the present disclosure provides a method for friction welding. Welding surfaces of metallic components are positioned relative to each other. A group of the metallic components has a group of relief features. The metallic components at the welding surfaces are joined by friction welding to form a structure. The group of relief features causes flash from the friction welding to occur in a manner that enables a subsequent joining at a subsequent welding surface on the structure without removing the flash.

Yet another embodiment of the present disclosure provides a friction welding system comprising metallic components for a structure and a friction welding system. The metallic components have welding surfaces. The friction welding system is configured to position the welding surfaces for the metallic components relative to each other. A metallic component in the metallic components has a relief feature adjacent to at least one of the welding surfaces. The friction welding system also joins the metallic components at the welding surfaces by friction welding. Flash from the friction welding forms with respect to the relief feature such that the flash is absent from a selected surface on the structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the flow of material from components in friction welding is undesirable when that material flows onto a surface or obstructs the surface that is to be joined to another component.

The illustrative embodiments recognize and take into account that the technical problem with the formation of flash in locations where additional joining of components is to occur may be solved using a mechanism that reduces the formation of flash in those locations. In one illustrative example, a method and apparatus are present for friction welding. Welding surfaces of metallic components are positioned relative to each other. A group of the metallic components has a relief feature adjacent to at least one of the welding surfaces. When used herein with reference to items, a "group of" means one or more items. For example, the "group of metallic components" is one or more metallic components.

The metallic components are joined at the welding surfaces by friction welding to form a structure. A flash from the friction welding forms with respect to a relief feature that enables a subsequent joining at a subsequent welding surface without removing the flash. For example, the flash may flow into the relief feature rather than onto or over the subsequent welding surface.

Figure 1:
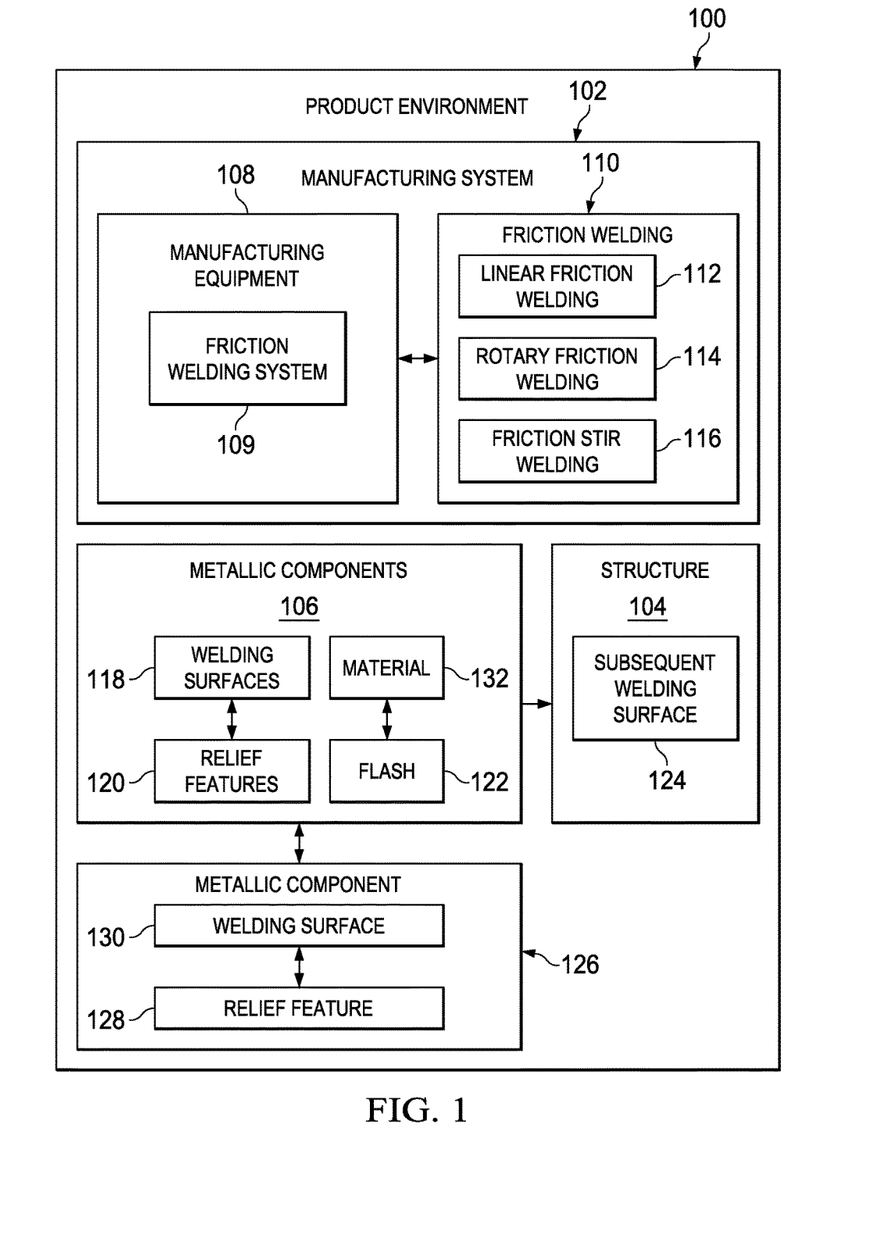
FIG. 1 is an illustration of a block diagram of a product environment in accordance with an illustrative embodiment.

With reference now to the figures and, in particular, with reference to FIG. 1, an illustration of a block diagram of a product environment is depicted in accordance with an illustrative embodiment. As depicted, product environment 100 is an environment in which manufacturing system 102 operates to manufacture products such as structure 104. In the illustrative example, structure 104 may take various forms. For example, structure 104 may be selected from one of an aircraft structure, an automobile structure, a spacecraft structure, a fitting, a flap support structure, a strut, a winglet, a flap, an engine housing, a fairing, a door, a wing box, an automobile frame, a brace, and some other suitable type of structure.

As depicted, structure 104 is formed from metallic components 106. Metallic components 106 may be comprised of the same type of material or different types of materials. For example, metallic components 106 may be comprised of a material selected from at least one of steel, titanium, aluminum, a metal alloy, a titanium alloy, or some other suitable type of metal or metal alloy.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Manufacturing equipment 108 in manufacturing system 102 may be used to manufacture metallic components 106. As depicted, metallic components 106 may be manufactured using a number of different processes selected from at least one of molding, forging, machining, rolling, and other processes.

In the illustrative example, metallic components 106 are joined using manufacturing equipment 108 to form structure 104. In particular, friction welding system 109 in manufacturing equipment 108 performs joining using equipment that employs friction welding 110.

Friction welding 110 may be performed by friction welding system 109 using currently available friction welding devices. For example, the type of friction welding 110 performed by friction welding system 109 may be selected from at least one of linear friction welding 112, rotary friction welding 114, or friction stir welding 116. When friction welding 110 is linear friction welding 112 or rotary friction welding 114, solid-state joining of metallic components 106 occurs using friction from welding surfaces 118 moving relative to each other. One or more of welding surfaces 118 may move.

With linear friction welding 112, one or more of metallic components 106 are moved relative to each other in a linear fashion. For example, metallic components 106 oscillate relative to each other. With rotary friction welding 114, one or more of metallic components 106 being joined rotate relative to each other. With friction stir welding 116, a rotating tool moves at the interface of welding surfaces 118 of metallic components 106 to join metallic components 106.

In one illustrative example, manufacturing equipment 108 manufactures metallic components 106 such that a group of metallic components 106 has a group of relief features 120. As depicted, manufacturing equipment 108 holds metallic components 106 and positions welding surfaces 118 of metallic components 106 relative to each other. A group of metallic components 106 has a group of relief features 120 adjacent to at least one of welding surfaces 118.

Manufacturing equipment 108 joins metallic components 106 at welding surfaces 118 by friction welding 110 to form structure 104. As depicted, flash 122 from friction welding 110 forms with respect to the group of relief features 120 in a manner that enables performing subsequent joining at subsequent welding surface 124 on structure 104 without removing flash 122.

More specifically, to join metallic components 106, manufacturing equipment 108 positions metallic components 106 such that welding surfaces 118 of metallic components 106 contact each other. In the illustrative example, metallic component 126 in metallic components 106 has relief feature 128 adjacent to welding surface 130 on metallic component 126.

Manufacturing equipment 108 moves welding surfaces 118 relative to each other while welding surfaces 118 are in contact such that solid-state joining of metallic components 106 at welding surfaces 118 occurs to form structure 104. Force may also be applied to metallic components 106 during solid-state joining. The force may be lateral such that welding surfaces 118 are pushed towards each other.

Material 132 flows from at least one of metallic components 106 to form flash 122 as part of joining metallic components 106. Relief feature 128 causes material 132 to flow with respect to relief feature 128 in a manner that enables performing an additional solid-state joining operation with structure 104 at subsequent welding surface 124 on the structure without removing flash 122.

In the illustrative example, relief feature 128 influences where material 132 may flow in forming flash 122. For example, material 132 may flow into relief feature 128.

In other words, relief feature 128 provides a location to channel or otherwise cause material 132 to move in a manner that avoids obstructing subsequent welding surface 124. For example, when flash 122 obstructs subsequent welding surface 124, flash 122 forms on subsequent welding surface 124, forms over subsequent welding surface 124, or some combination thereof. When flash 122 obstructs subsequent welding surface 124, flash 122, in some examples, may not be on or over subsequent welding surface 124. Flash 122 may be in a location such that subsequent welding surface 124 on structure 104 is unable to contact the welding surface on another component in metallic components 106 that is to be joined to structure 104.

As depicted, relief feature 128 in relief features 120 is selected from one of a gap, a channel, a volume, a conduit, a notch, a cavity, a depression, or some other suitable feature that directs the formation of flash 122 away from subsequent welding surface 124. At least one of the shape, size, or location of relief feature 128 is selected to reduce formation of flash 122 that obstructs subsequent welding surface 124.

The formation of flash 122 may be influenced by relief feature 128 in a number of different ways. In the illustrative example, relief feature 128 may have a shape that causes flash 122 to flow into relief feature 128. For example, relief feature 128 may be a notch into which material 132 flows to form flash 122. In another illustrative example, relief feature 128 may cause flash 122 to flow in a direction away from subsequent welding surface 124.

In the illustrative example, when relief feature 128 is a channel, the channel may be open in a manner similar to a canal for water. Flash 122 may flow into the channel without reaching subsequent welding surface 124. In another example, the channel may be enclosed with an opening at the surface of the component. With this configuration, material 132 may flow into the channel to form flash 122.

Thus, one or more technical solutions are present that overcome a technical problem with reducing the time needed to join components using friction welding to form a structure. More specifically, the illustrative example provides one or more technical solutions that overcome the technical problem with flash being formed during joining of components on locations where subsequent joining is to occur in forming a structure.

As a result, one or more technical solutions may provide a technical effect of reducing the time and cost for manufacturing structures. In particular, the technical effect is present in which machining of a welding surface for joining the component to a structure being manufactured may be avoided. As a result, the time needed for setting up the structure on a machining tool, machining, then setting up the structure backup on friction welding system 109 may be avoided. In the illustrative example, machining of flash may be performed after joining operations using friction welding have been completed.

The illustration of product environment 100 and the different components in product environment 100 FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the location of relief feature 128 adjacent to welding surface 130 may be selected to reduce the formation of flash 122 on surfaces other than subsequent welding surface 124. For example, surfaces may be identified for which flash 122 is more difficult to remove. As a result, selecting the size and location of relief features 120 may reduce the formation of flash 122 on the surfaces. Additionally, flash 122 may form in a manner that does not require removal.

In another illustrative example, metallic component 126 may have one or more relief features in addition to relief feature 128. These relief features may have a size and location relative to welding surface 130 that further reduce the possibility that flash 122 may form in a manner that obstructs subsequent welding surface 124.

Figure 2:
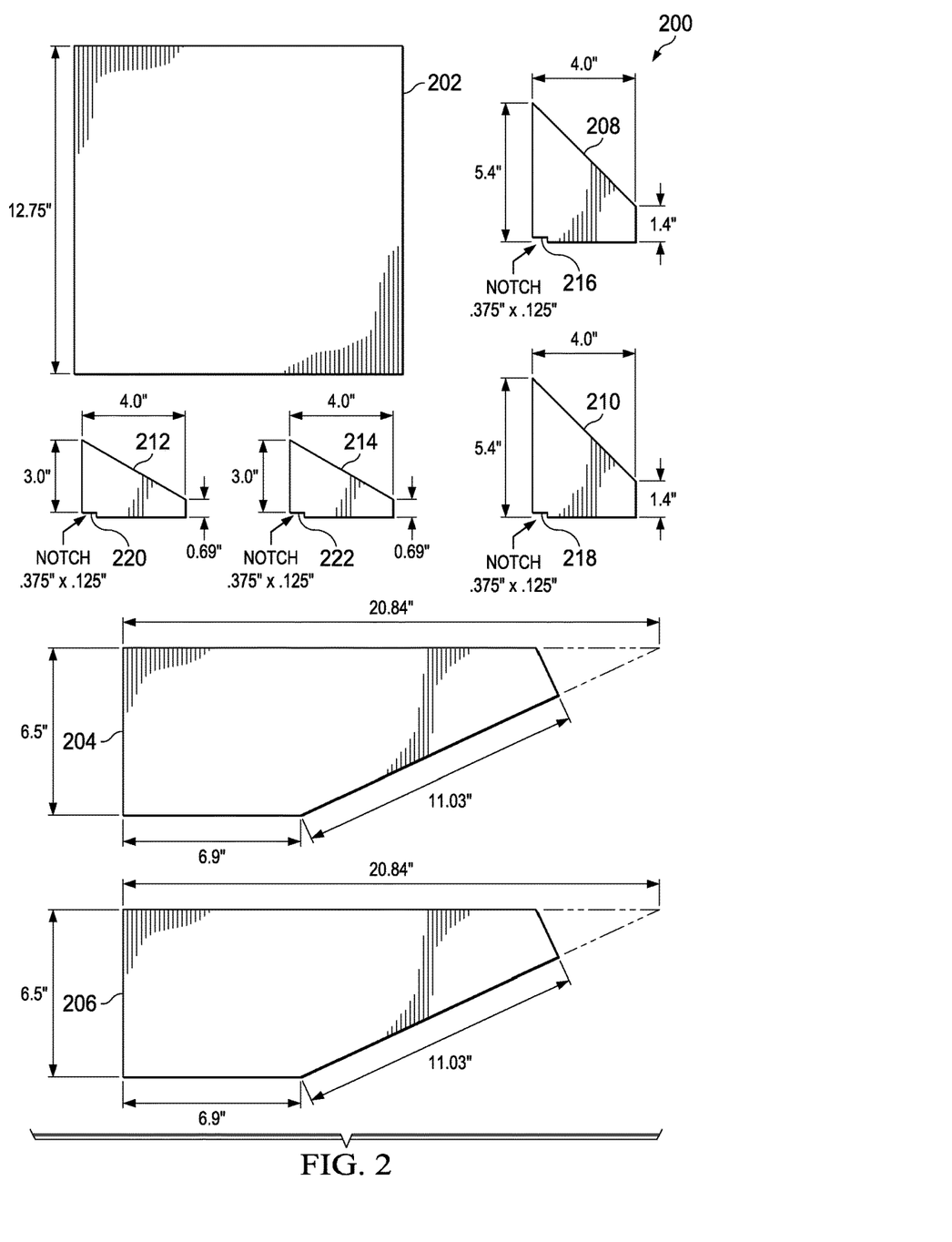
FIG. 2 is an illustration of components for a structure in accordance with an illustrative embodiment.

Turning next to FIG. 2, an illustration of components for a structure is depicted in accordance with an illustrative embodiment. In this figure, metallic components 200 are used to form a structure in the form of a flap support structure. Metallic components are an example of one implementation for metallic components 106 shown in block form in FIG. 1. Metallic components 200 are joined using liner friction welding in this illustrative example. As depicted, metallic components 200 include base plate 202, side plate 204, side plate 206, large plate 208, large plate 210, small plate 212, and small plate 214.

In this illustrative example, large plate 208, large plate 210, small plate 212, and small plate 214 have relief features in the form of notches. For example, large plate 208 has notch 216, and large plate 210 has notch 218. Further, small plate 212 has notch 220, and small plate 214 has notch 222. These notches are examples of relief features 120 shown in block form in FIG. 1. These notches prevent the formation of flash in undesired locations on metallic components 200 during joining operations using linear friction welding that obstruct a subsequent friction welding operation.

Turning now to FIGS. 3-9, an illustration of a process for forming a structure using linear friction welding is depicted in accordance with an illustrative embodiment. The different joining operations are performed using linear friction welding in these figures.

Figure 3:
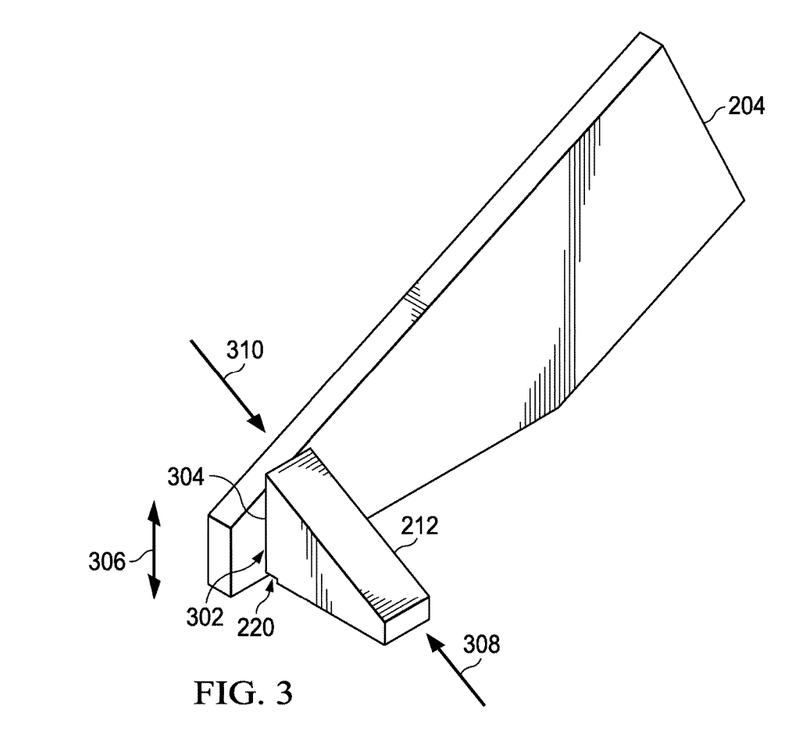
FIG. 3 is an illustration of two components positioned to form a structure using friction welding in accordance with an illustrative embodiment.

With reference now to FIG. 3, an illustration of two components positioned to form a structure using friction welding is depicted in accordance with an illustrative embodiment. In the illustrative examples, the same reference numeral may be used in more than one figure. This reuse of a reference numeral in different figures represents the same element in the different figures.

As depicted, small plate 212 and side plate 204 may be joined to each other using linear friction welding. As depicted, small plate 212 and side plate 204 are positioned such that welding surface 302 on small plate 212 and welding surface 304 on side plate 204 contact each other.

At least one of small plate 212 or side plate 204 are moved relative to each other such that welding surface 302 and welding surface 304 move relative to each other in a manner such that the friction causes solid-state joining of small plate 212 and side plate 204 at welding surface 302 and welding surface 304. For example, small plate 212 may be moved back and forth in the direction of arrow 306. The movement may be an oscillating movement. Side plate 204 also may be moved back and forth in the direction of arrow 306. One or both of small plate 212 and side plate 204 may be moved.

Further, force may be applied laterally during the solid-state joining. For example, force may be applied on small plate 212 in the direction of arrow 308. Force may also be applied on side plate 204 in the direction of arrow 310.

Figure 4:
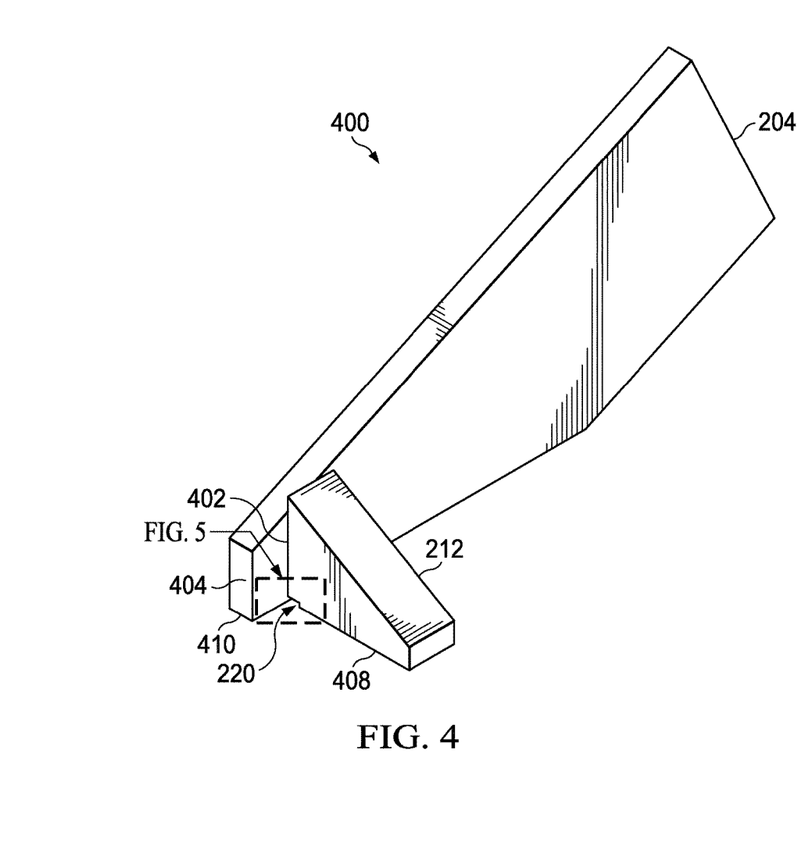
FIG. 4 is an illustration of two components joined to form a structure in accordance with an illustrative embodiment.

With reference now to FIG. 4, an illustration of two components joined to form a structure is depicted in accordance with an illustrative embodiment. In this example, small plate 212 and side plate 204 have been joined to each other using linear friction welding to form flap support structure 400.

As depicted, flash 402 has been formed joining small plate 212 and side plate 204 together to form flap support structure 400. Section 404 is shown in enlarged view 406.

Figure 5:
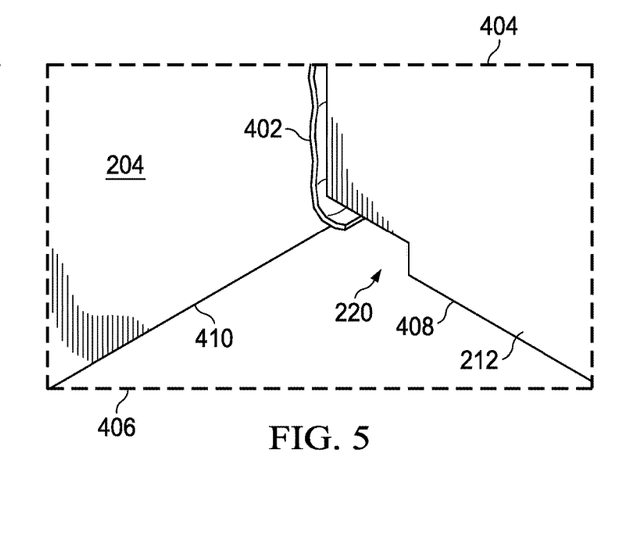
FIG. 5 an illustration of an enlarged view of a portion of two components joined to form a structure in accordance with an illustrative embodiment.

With reference to FIG. 5, an illustration of an enlarged view of a portion of two components joined to form the structure in FIG. 4 is depicted in accordance with an illustrative embodiment. Enlarged view 406 shows where flash 402 formed from joining small plate 212 and side plate 204 to each other.

As seen in enlarged view 406, the size and location of notch 220 results in an absence of flash 402 on subsequent welding surface 408 on small plate 212 and subsequent welding surface 410 on side plate 204. In other words, the formation of flash 402 does not obstruct subsequent welding surface 408 and subsequent welding surface 410.

In this example, flash 402 does not form on subsequent welding surface 408 and subsequent welding surface 410, and does not form over subsequent welding surface 408 and subsequent welding surface 410. As depicted, flash 402 results from the material from small plate 212 and side plate 204 flowing into notch 220 during the joining operation.

As a result, another joining operation using subsequent welding surface 408 and subsequent welding surface 410 may be performed without needing to remove flash 402 from subsequent welding surface 408 and subsequent welding surface 410. Thus, intermediate machining operations are avoided, reducing the time needed to form flap support structure 400.

Figure 6:
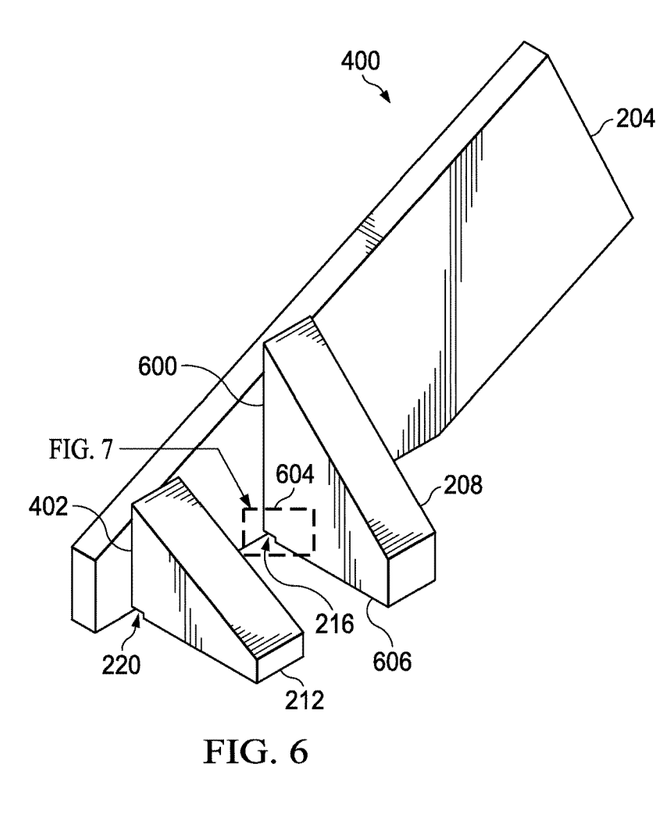
FIG. 6 is an illustration of a component joined to a structure in accordance with an illustrative embodiment.

With reference next to FIG. 6, an illustration of a component joined to a structure is depicted in accordance with an illustrative embodiment. In this illustrative example, large plate 208 has been joined to side plate 204 in flap support structure 400. The joining was also performed using linear friction welding in this illustrative example.

Flash 600 is present from joining large plate 208 to side plate 204. Flash 600 is seen in more detail in enlarged view 602 of section 604.

Figure 7:
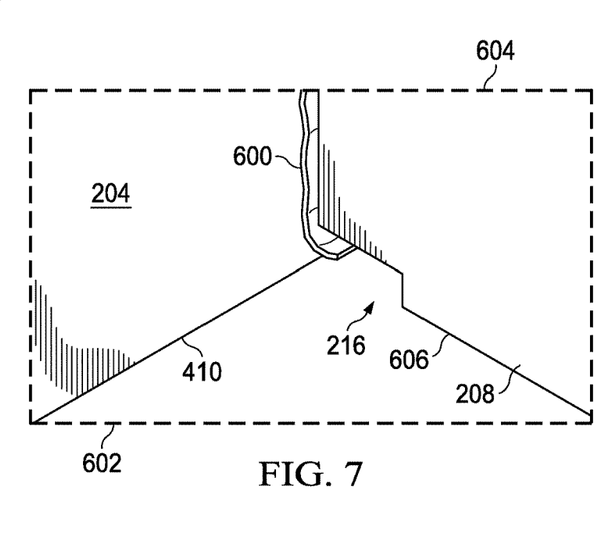
FIG. 7 is an illustration of an enlarged view of a portion of the component joined to a structure in accordance with an illustrative embodiment.

In FIG. 7, an illustration of an enlarged view of a portion of the component joined to the structure in FIG. 6 is depicted in accordance with an illustrative embodiment. In this illustrative example, the size and location of notch 216 on large plate 208 results in an absence of flash 600 on subsequent welding surface 606 on large plate 208 and subsequent welding surface 410 on side plate 204 as shown in enlarged view 602 of section 604.

Figure 8:
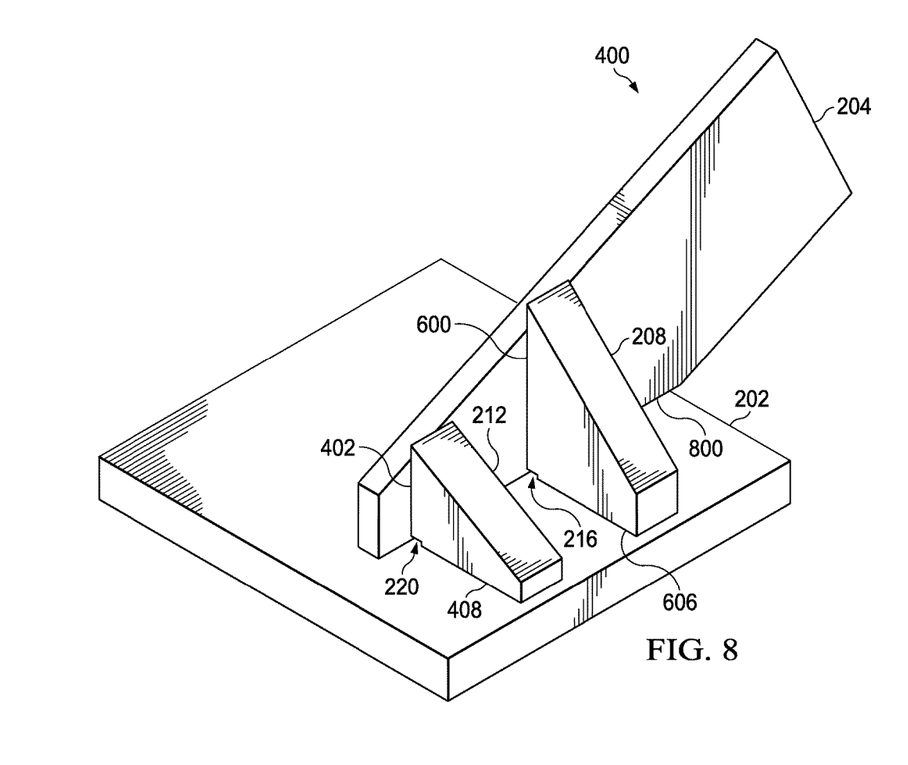
FIG. 8 is an illustration of joining components to a structure in accordance with an illustrative embodiment.

With reference next to FIG. 8, an illustration of joining components to a structure is depicted in accordance with an illustrative embodiment. In this illustrative example, base plate 202 has been joined to flap support structure 400. As shown in this example, subsequent welding surface 606 on large plate 208, subsequent welding surface 410 on side plate 204, and subsequent welding surface 408 on small plate 212 have been joined to welding surface 800 on base plate 202.

With notch 220 on small plate 212 and notch 216 on large plate 208, machining is unnecessary to remove flash 402 and flash 600 prior to joining these components to each other. In this manner, intermediate machining to remove flash 402 and flash 600 is reduced or avoided. As a result, the time needed to complete flap support structure 400 is reduced.

Figure 9:
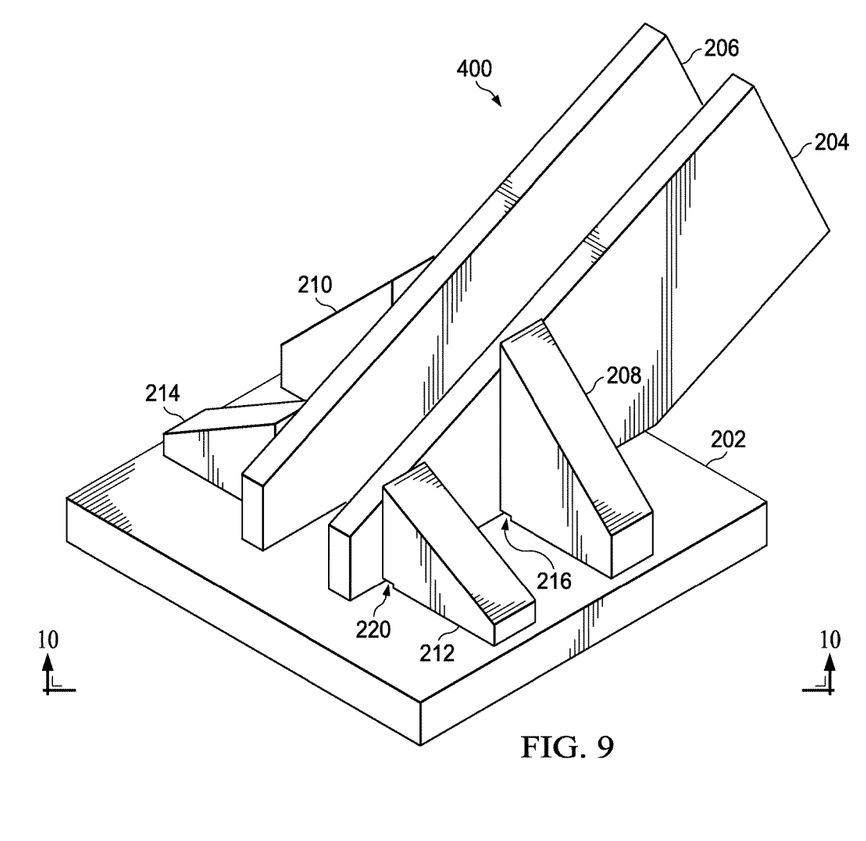
FIG. 9 is an illustration of joining components to a structure in accordance with an illustrative embodiment.

Turning now to FIG. 9, an illustration of joining components to a structure is depicted in accordance with an illustrative embodiment. In this illustrative example, side plate 206, small plate 214, and large plate 210 have been joined in a manner similar to that illustrated for side plate 204, small plate 212, and large plate 208. In turn, these joined components have been joined to base plate 202 in flap support structure 400. The addition of these components completes flap support structure 400.

Figure 10:
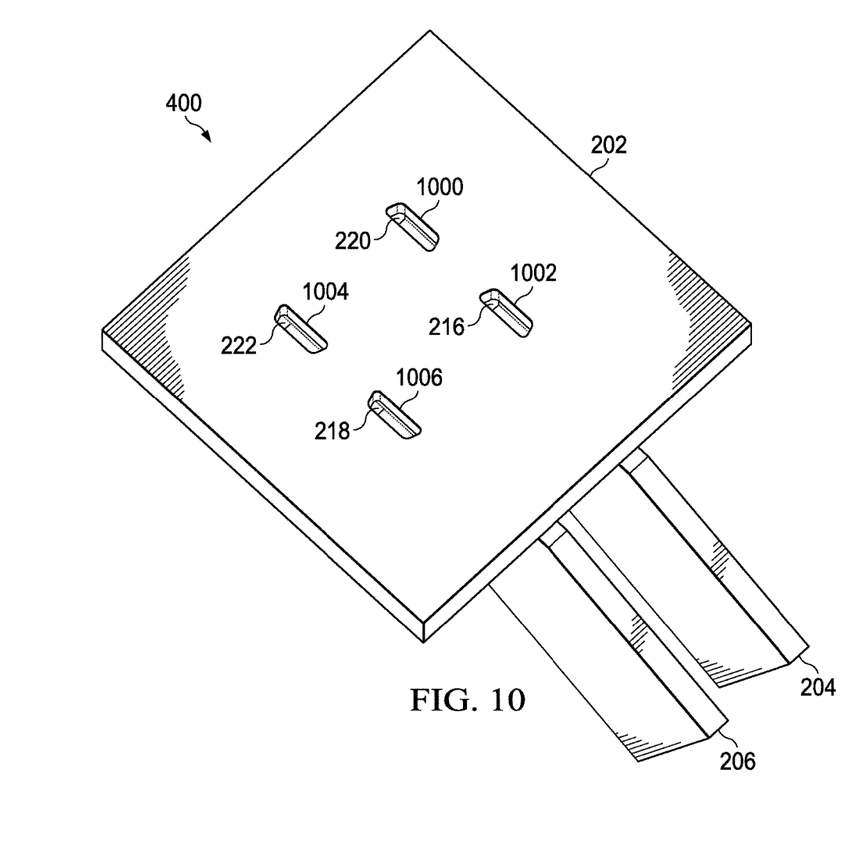
FIG. 10 is an illustration of a partially machined structure in accordance with an illustrative embodiment.

With reference now to FIG. 10, an illustration of a partially machined structure is depicted in accordance with an illustrative embodiment. A view of flap support structure 400 taken in the direction of lines 10-10 in FIG. 9 is shown.

In this illustrative example, flap support structure 400 has been partially machined. As depicted, hole 1000, hole 1002, hole 1004, and hole 1006 have been formed as part of the machining process to remove flash from flap support structure 400. In this example, flash is removed from locations where notch 216, notch 218, notch 220, and notch 222 are located through hole 1000, hole 1002, hole 1004, and hole 1006, respectively.

Figure 11:
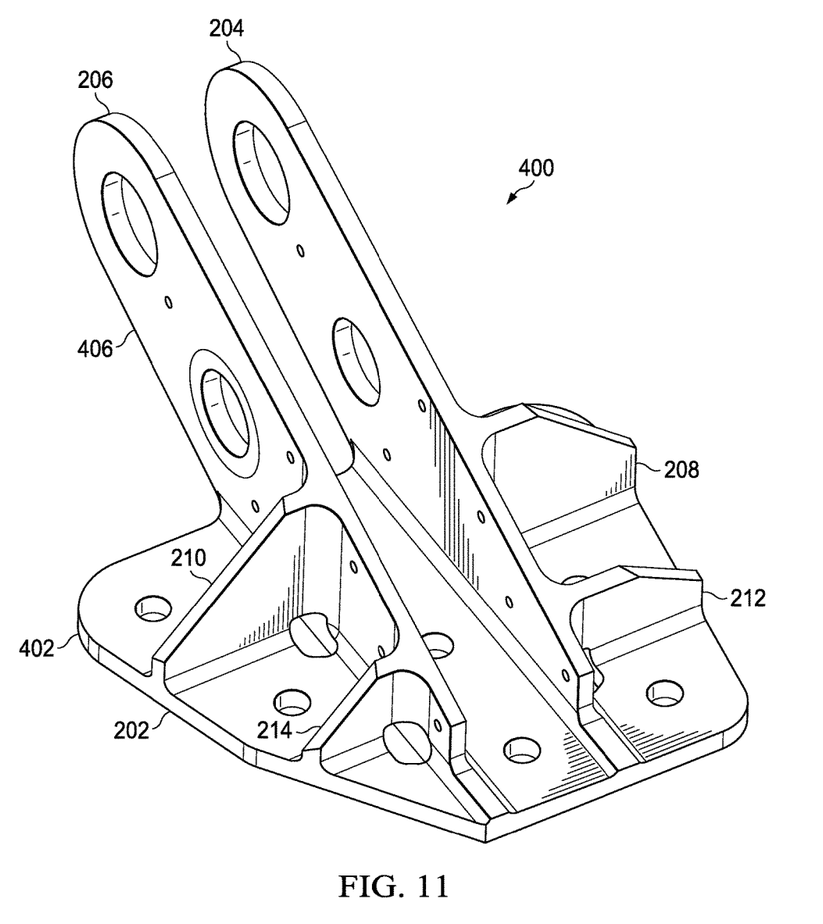
FIG. 11 is an illustration of a finished structure in accordance with an illustrative embodiment.

With reference next to FIG. 11, an illustration of a finished structure is depicted in accordance with an illustrative embodiment. In this depicted example, flap support structure 400 is shown in the completed form after machining has been performed to remove flash and refine features on flap support structure 400.

The illustration of the components and processes for manufacturing structure 400 in FIGS. 3-11 have been shown for purposes of illustrating one manner in which joining components to form a structure may be performed. The illustration is not meant to limit the manner in which other structures may be formed in accordance with an illustrative embodiment.

For example, joining of components to form other structures may be performed in other illustrative examples other than flap support structure 400. Components may be used to form a brace, a winglet, a strut, or some other suitable type of structure depending on the particular implementation.

Additionally, in another illustrative example, a component may have more than one relief structure. Also, other configurations of relief structures may be used other than notches.

Figure 12:
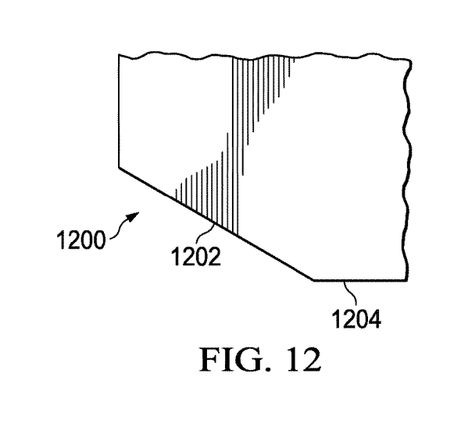
FIG. 12 is an illustration of a relief feature with a beveled edge in accordance with an illustrative embodiment.
Figure 13:
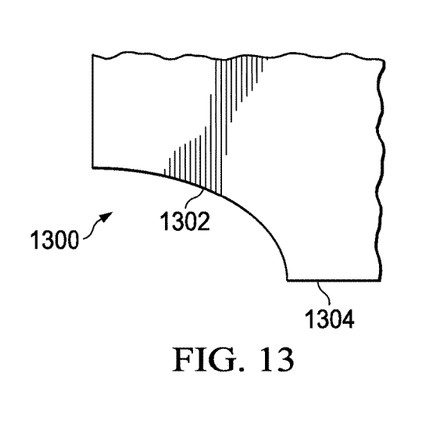
FIG. 13 is an illustration of a relief feature with a radius edge is depicted in accordance with an illustrative embodiment.
Figure 14:
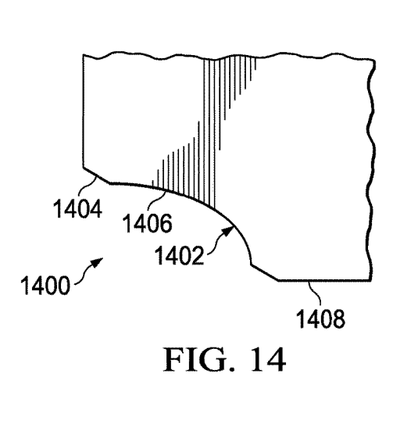
FIG. 14 is an illustration of a relief feature combining a beveled edge and a radius edge in accordance with an illustrative embodiment.

Turning to FIG. 12-14, illustrations of relief structures are depicted in accordance with an illustrative embodiment. As depicted, relief features shown in FIG. 12-14 are examples of some possible implementations for relief features 120 shown in block form in FIG. 1. For example, these relief features may be used in place of the notches for large plate 208, large plate 210, small plate 212, and small plate 214 in FIG. 2.

Turning first to FIG. 12, an illustration of a relief feature with a beveled edge is depicted in accordance with an illustrative embodiment. In this illustrative example, relief feature 1200 is a beveled relief feature that has beveled edge 1202 adjacent to welding surface 1204.

With reference next to FIG. 13, an illustration of a relief feature with a radius edge is depicted in accordance with an illustrative embodiment. As depicted, relief feature 1300 is a radius relief feature that has radius edge 1302 adjacent to welding surface 1304.

In FIG. 14, an illustration of a relief feature combining a beveled edge and a radius edge is depicted in accordance with an illustrative embodiment. In this example, relief feature 1400 is a mixed radius relief that has edge 1402 that includes beveled portion 1404 and radius portion 1406 adjacent to welding surface 1408.

These examples in FIGS. 12-14 are shown to illustrate some additional non-limiting configurations for relief features. The illustration is not meant to limit the manner in which other relief features may be implemented. For example, another relief feature may be a hemispherical depression in the surface adjacent to the welding surface.

Figure 15:
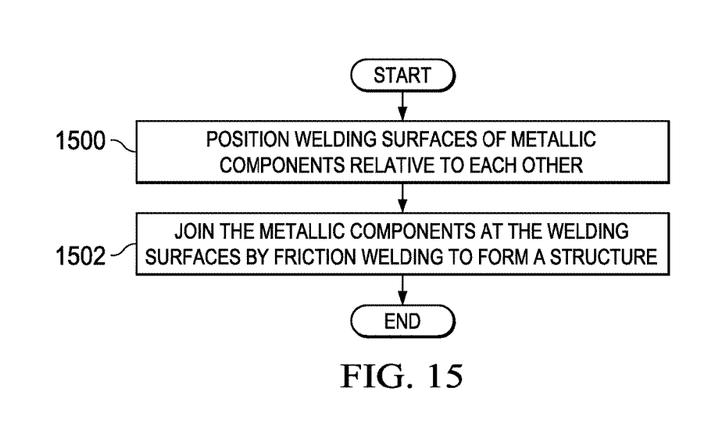
FIG. 15 is an illustration of a flowchart of a process for friction welding in accordance with an illustrative embodiment.

Turning next to FIG. 15, an illustration of a flowchart of a process for friction welding is depicted in accordance with an illustrative embodiment. The process illustrated in FIG. 15 may be implemented in product environment 100 in FIG. 1. In particular, the process may be implemented in manufacturing system 102 to manufacture structure 104 using friction welding 110. Friction welding performed in this flowchart may be selected from one of linear friction welding, rotary friction welding, and friction stir welding.

The process begins by positioning welding surfaces of metallic components relative to each other (operation 1500). A group of the metallic components has a group of relief features.

The process joins the metallic components at the welding surfaces by friction welding to form a structure (operation 1502) with the process terminating thereafter. The group of relief features causes a flash forming from material flowing from friction welding to occur in a manner that enables a subsequent joining at a subsequent welding surface on the structure without first removing the flash.

Figure 16:
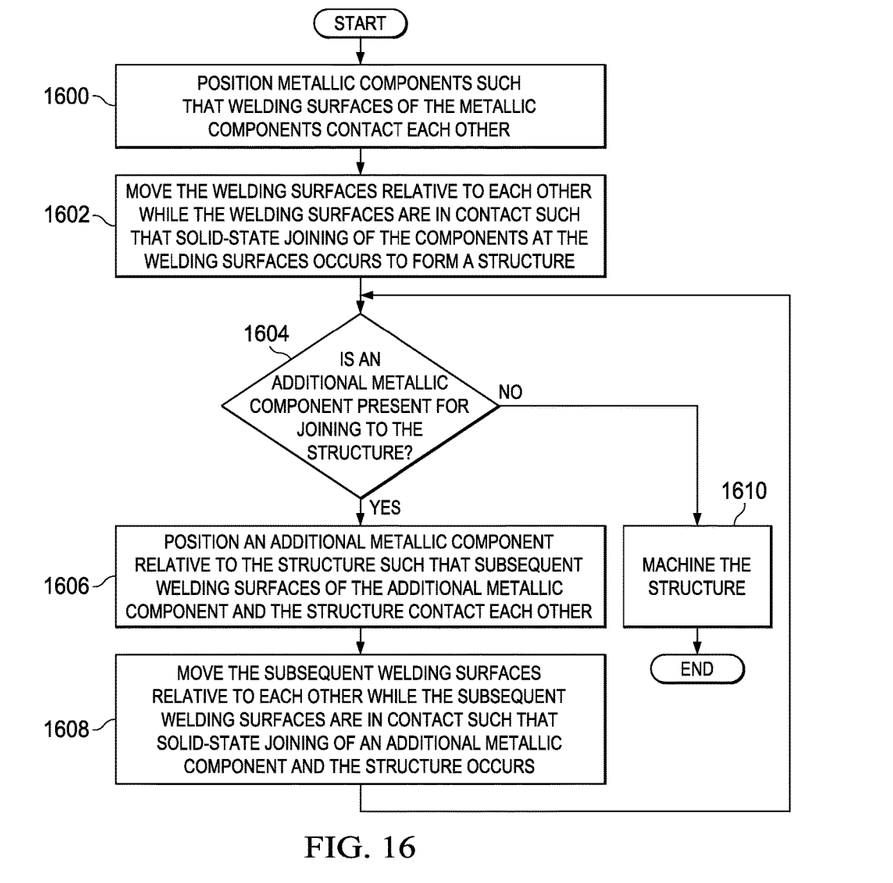
FIG. 16 is an illustration of a flowchart of a process for friction welding in accordance with an illustrative embodiment.

Turning next to FIG. 16, an illustration of a flowchart of a process for friction welding is depicted in accordance with an illustrative embodiment. The process illustrated in FIG. 16 may be implemented in product environment 100 in FIG. 1. In particular, the process may be implemented in manufacturing system 102 to manufacture structure 104 using friction welding 110. Friction welding performed in this flowchart may be selected from one of linear friction welding and rotary friction welding.

The process begins by positioning metallic components such that welding surfaces of the metallic components contact each other (operation 1600). A component in the metallic components has a relief feature adjacent to a welding surface for the metallic component.

The process moves the welding surfaces relative to each other while the welding surfaces are in contact such that solid-state joining of the metallic components at the welding surfaces occurs to form a structure (operation 1602). A material from at least one of the metallic components flows with respect to the relief feature in a manner that enables performing an additional solid-state joining operation with the structure at a subsequent welding surface on the structure without removing the flash.

A determination is made as to whether an additional metallic component is present for joining to the structure (operation 1604). If an additional metallic component is present, the process positions an additional metallic component relative to the structure such that subsequent welding surfaces of the additional metallic component and the structure contact each other (operation 1606). At least one of the additional metallic component or the structure has an additional relief feature adjacent to the welding surfaces.

The process moves the subsequent welding surfaces relative to each other while the subsequent welding surfaces are in contact such that solid-state joining of an additional metallic component and the structure occurs (operation 1608). The additional metallic component is joined to the structure in operation 1608. Additional flash forms with respect to the additional relief feature such that a selected surface of the structure is unobstructed by the additional flash in operation 1608. The process returns to operation 1604.

With reference again to operation 1604, if an additional metallic component is not present, the process machines the structure (operation 1610) with the process terminating thereafter. Operation 1610 is performed when joining operations are completed for the structure. In operation 1610, the flash is removed from the structure and machining the structure multiple times is avoided.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the flowchart in FIG. 15 and in FIG. 16 may include an operation in which force is applied to one or more of the metallic components during friction welding. As another example, more than one type of friction welding may be performed depending on the configuration of the components being joined. In step 1604 in FIG. 16, the additional component may not have an additional relief feature in some examples.

Figure 17:
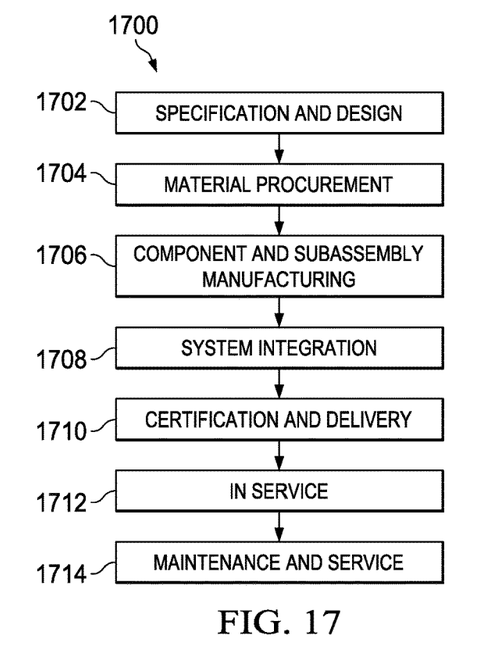
FIG. 17 is an illustration of a block diagram of an aircraft manufacturing and service method in accordance with an illustrative embodiment.
Figure 18:
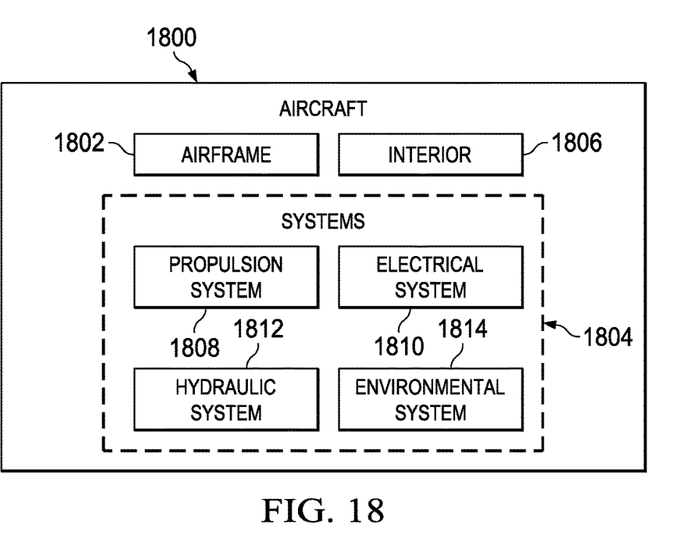
FIG. 18 is an illustration of a block diagram of an aircraft in accordance with an illustrative embodiment.

Illustrative embodiments of the disclosure may be described in the context of aircraft manufacturing and service method 1700 as shown in FIG. 17 and aircraft 1800 as shown in FIG. 18. Turning first to FIG. 17, an illustration of a block diagram of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 may go through certification and delivery 1710 in order to be placed in service 1712. While in service 1712 by a customer, aircraft 1800 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of a block diagram of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17.

As yet another example, one or more apparatus embodiments, method embodiments, or a combination thereof may be utilized during production stages, such as component and subassembly manufacturing 1706 and system integration 1708 in FIG. 17. For example, structures may be manufactured using friction welding in a manner that reduces the number of times that machining is performed to manufacture the structures. The use of relief features reduces the formation of flash on or over surfaces that may be joined to other components.

One or more apparatus embodiments, method embodiments, or a combination thereof may be utilized while aircraft 1800 is in service 1712, during maintenance and service 1714 in FIG. 17, or both. The use of a number of the different illustrative embodiments may substantially expedite the assembly of aircraft 1800, reduce the cost of aircraft 1800, or both expedite the assembly of aircraft 1800 and reduce the cost of aircraft 1800.

One or more illustrative examples provide a method and apparatus for forming structures using friction welding in a manner that enables performing subsequent joining operations using friction welding without requiring machining of services to be joined to remove flash. As a result, the set ups for moving a structure back and forth between a friction welding system and a machining system may be reduced.

Additionally, the use of friction welding with these features makes performing features using friction welding less time-consuming than machining the structures from a block of material. As a result, a reduction in the cost for material as well as a reduction in manufacturing time may result from using an illustrative example to form structures using friction welding.

As a result, the cost of manufacturing structures may be reduced through savings in material purchased. Additionally, the time that tools for machining are used is also reduced. This reduction in time reduces the cost and increases the speed at which structures may be manufactured. Further, with the reduced amount of machining performed, the amount of wear on tools used to form the structure may be reduced.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for friction welding, the method comprising:
positioning metallic components such that welding surfaces of the metallic components contact each other, wherein a metallic component in the metallic components has a relief feature adjacent to a welding surface for a first metallic component;
moving the welding surfaces relative to each other while the welding surfaces are in contact such that solid-state joining of the metallic components at the welding surfaces occurs to form a structure, wherein the relief feature causes a material from at least one of the metallic components to form with respect to the relief feature in a manner that enables performing an additional solid-state joining operation with the structure at a subsequent welding surface on the structure without removing flash;

wherein the metallic components comprise the first metallic component and a second metallic component;

wherein the relief feature comprises a cut-away portion of an edge of the second metallic component, the cut-away portion comprising a notch having no more than two planar surfaces, wherein one of the two planar surfaces is approximately perpendicular to a surface of the first metallic component and a second planar surface is approximately parallel to the surface of the first metallic component; and machining the structure when joining operations are completed for the structure, wherein the flash is removed from the structure by:
forming a group of holes in the structure, and
machining the flash through the group of holes.

2. The method of claim 1 further comprising:
applying a force to the metallic components during movement of the welding surfaces.

3. The method of claim 1, wherein the relief feature is a first relief feature, the welding surfaces are first welding surfaces, and further comprising:
positioning an additional metallic component relative to the structure such that subsequent welding surfaces of the additional metallic component and the structure contact each other, wherein at least one of the additional metallic component or the structure has an additional relief feature adjacent to the subsequent welding surfaces; and
moving the subsequent welding surfaces relative to each other while the subsequent welding surfaces are in contact such that solid-state joining of the additional metallic component and the structure occurs, wherein additional flash forms with respect to the additional relief feature such that a selected surface of the structure is unobstructed by the additional flash.

4. The method of claim 1, wherein the friction welding is selected from one of linear friction welding, rotary friction welding, and friction stir welding.

5. The method of claim 1, wherein the relief feature is selected from at least one of a gap, a channel, a volume, a conduit, a notch, a cavity, and a depression.

6. The method of claim 1, wherein the material in the metallic components is selected from at least one of steel, titanium, aluminum, a metal alloy, or a titanium alloy.

7. The method of claim 1, wherein the structure is selected from one of an aircraft structure, an automobile structure, a spacecraft structure, a fitting, a flap support structure, a strut, a winglet, a flap, an engine housing, a fairing, a door, a wing box, an automobile frame, and a brace.

8. A method for friction welding, the method comprising:
positioning welding surfaces of metallic components relative to each other, wherein a group of the metallic components has a group of relief features;
joining the metallic components at the welding surfaces by friction welding to form a structure, wherein the group of relief features causes flash from the friction welding to occur in a manner that enables a subsequent joining at a subsequent welding surface on the structure without removing the flash;
wherein the metallic components comprise a first metallic component and a second metallic component;
wherein a relief feature in the group of relief features comprises a cut-away portion of an edge of the second metallic component, the cut-away portion comprising a notch having no more than two planar surfaces, wherein one of the two planar surfaces is approximately perpendicular to a surface of the first metallic component and a second planar surface is approximately parallel to the surface of the first metallic component; and
removing the flash from the structure when joining operations are completed for the structure by:
forming a group of holes in the structure, and
machining the flash through the group of holes.

9. The method of claim 8, wherein the subsequent welding surface on the structure is unobstructed by the flash such that the subsequent joining is performed without removing the flash.

10. The method of claim 8 further comprising:
applying a force to the metallic components during movement of a joining of the welding surfaces.

11. The method of claim 8, wherein the relief feature is selected from one of a gap, a channel, a volume, a conduit, a notch, a cavity, and a depression.

12. The method of claim 8, wherein a material in the metallic components is selected from at least one of steel, titanium, aluminum, a metal alloy, or a titanium alloy.

13. The method of claim 8, wherein the structure is selected from one of an aircraft structure, an automobile structure, a spacecraft structure, a fitting, a flap support structure, a strut, a winglet, a flap, an engine housing, a fairing, a door, a wing box, an automobile frame, and a brace.

14. The method of claim 8, wherein the friction welding is selected from one of linear friction welding, rotary friction welding, and friction stir welding.

* * * * *